June 2, 1953   T. R. SCOTT ET AL   2,640,501
TUBE AND ITS MANUFACTURE
Filed Feb. 27, 1948   5 Sheets-Sheet 1

INVENTOR.
THOMAS R. SCOTT
WILLIAM K. WESTON
BY
ATTORNEY

June 2, 1953  T. R. SCOTT ET AL  2,640,501
TUBE AND ITS MANUFACTURE
Filed Feb. 27, 1948  5 Sheets-Sheet 2

INVENTOR.
THOMAS R. SCOTT
WILLIAM K. WESTON
BY
ATTORNEY

INVENTOR.
THOMAS R. SCOTT
WILLIAM K. WESTON
BY

ATTORNEY

June 2, 1953  T. R. SCOTT ET AL  2,640,501
TUBE AND ITS MANUFACTURE
Filed Feb. 27, 1948  5 Sheets-Sheet 4
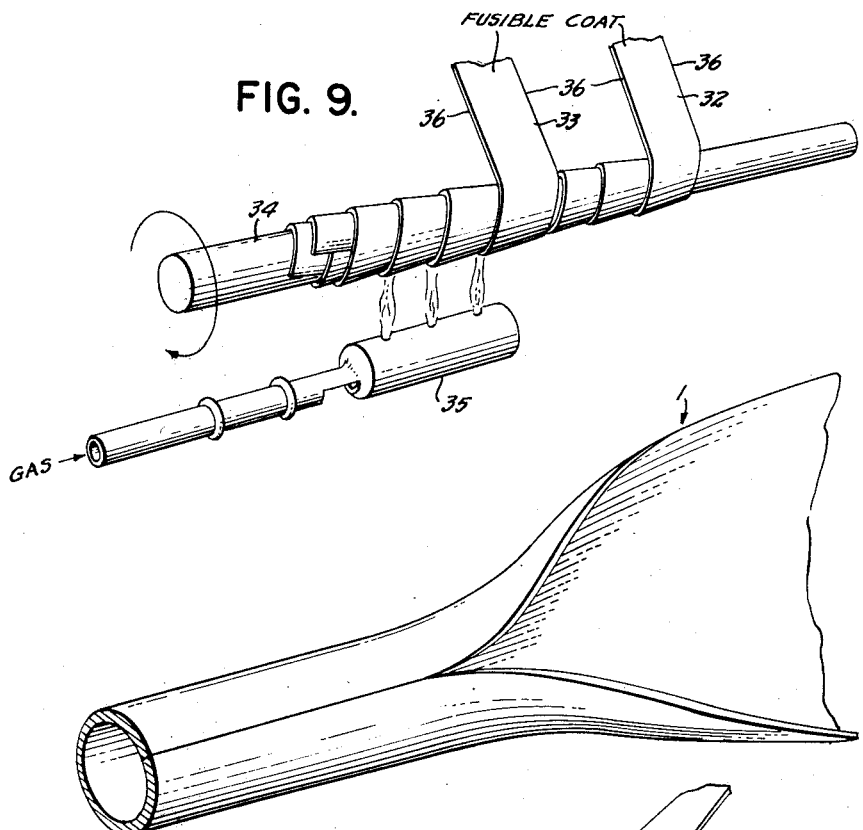
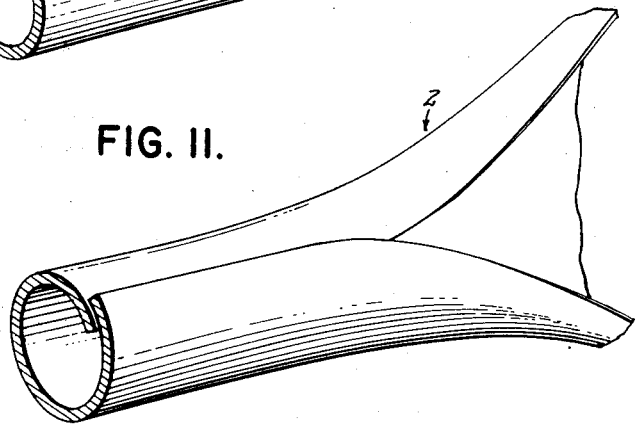
INVENTOR.
THOMAS R. SCOTT
WILLIAM K. WESTON
BY
ATTORNEY

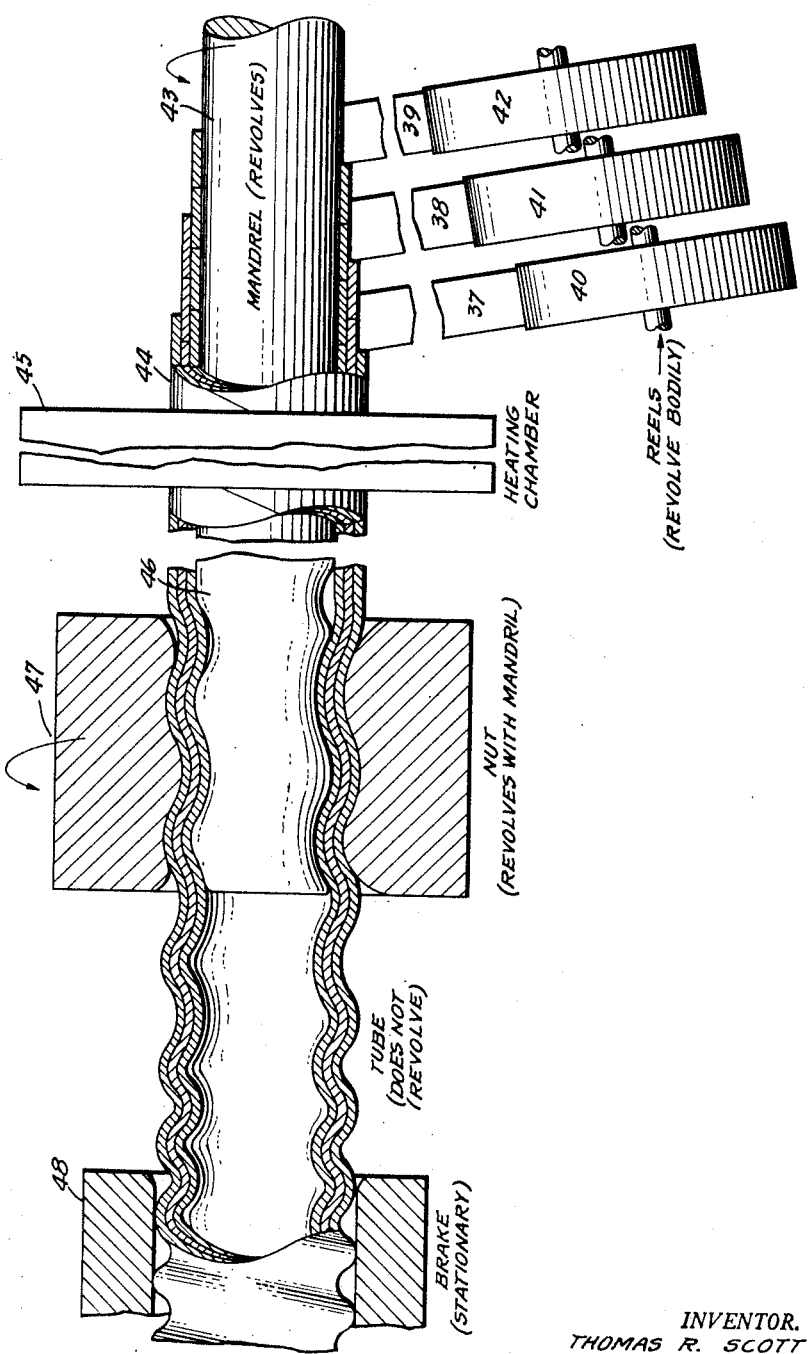

Patented June 2, 1953

2,640,501

UNITED STATES PATENT OFFICE 2,640,501

TUBE AND ITS MANUFACTURE

Thomas Robertson Scott and William Kirby Weston, London, England, assignors to International Standard Electric Corporation, New York, N. Y.

Application February 27, 1948, Serial No. 11,588
In Great Britain December 24, 1946

Section 1, Public Law 690, August 8, 1946
Patent expires December 24, 1966

7 Claims. (Cl. 138—56)

This invention relates to moisture-proof tubes and the manufacture thereof, whether the tubes are manufactured as such or as part of composite structures, for instance, tubes incorporating non-metallic as well as metallic elements, or tubes forming part of more complex structures, such as sheaths or the like for cables for electrical telecommunication or power transmission purposes.

The term "tube" is to be taken as including continuous envelopes of similar cross-section throughout, whatever the shape of the cross-section, e. g. circular, oval, rectangular, polygonal, and whether symmetrical or unsymmetrical.

According to one of its features the invention consists of a method of manufacturing a tube, having at least three layers including the steps of applying an intermediate layer or layers in discontinuous form and integrating the said intermediate layer or layers by heat into a continuous moisture-proof carrier.

According to another of its features the invention consists of a tube having at least three layers of which one or more intermediate layers form a continuous moisture proof barrier or barriers.

According to another of its features the invention consists of an electric cable or similar structure having a sheath consisting of at least three layers of which one or more intermediate layers form a continuous moisture-proof barrier or barriers.

Such an intermediate layer to be integrated as aforesaid need not be applied separately in the fabrication of the tube but may be applied as a sealing or contiguous to another or other layers in which case such intermediate layer to be integrated as aforesaid will be applied at the same time as the other layer or layers which is or are coated so that in such circumstances the tube may be wound or otherwise formed from, two strips only, which after heating, constitute three different though adherent layers of which the middle one is moisture-proof.

The invention will now be described in relation to the accompanying drawings in which.

Fig. 9 illustrates diagrammatically a method of making a tube from two spirally wound tapes with overlapping joints.

Fig. 11 shows a strip folded longitudinally into cylindrical shape, with butting edges and overlapping edges.

Fig. 12 illustrates diagrammatically a method of making a corrugated tube from three spirally wound tapes.

The description, which follows, of construction and manufacture of such tubes, is subdivided under the following headings.

Materials.
Methods of heating the intermediate moisture-proof layer.
Methods of manufacture.
Methods of giving flexibility to tube, if required.
Variable volume.

Materials

The intermediate layer to be integrated by heat may be of a metal having a low melting point such as silver, tin, zinc, lead, tinned lead, or alloys of these metals or any of them, with or without other alloying ingredients.

Such a layer may form a coating on a metallic carrier layer, in which case iron, steel, aluminium or copper may be used for the carrier layer.

Alternatively, however, the layer to be integrated may consist of a metal layer carrier by a non-metallic backing, e. g. plastic sheet or strip coated on one or both sides with one of the above metals, silver or zinc being particularly suitable. The edges of the backing may also be metal-coated and this may be essential for some purposes, as will appear in the later description.

Alternatively a non-metallic material capable of integrating or jointing under the action of heat may be used, for instance, thermoplastics such as polyisobutylene, polythene, polystyrene, polyvinyl, chloride, rubber, and compounds of these materials, such as polyisobutylene with loading material such as graphite and with or without additions of polythene or polystyrene.

Suitable materials should have a low moisture permeability constant, and sheet or strip up to a thickness of the order of 10 mils. can be used.

The inner and outer layers of a tube can be of metal, or suitable non-metallic material, e. g.

paper. Both layers can be of metal, both of non-metallic material, or one of metal and one of non-metallic material. The metal used may be for example iron, steel, aluminium or copper: for certain purposes the metal should be of high elasticity and high elastic limit, such as steel or certain aluminium alloys.

It would be possible in the case of a metal intermediate layer to incorporate with it an additional layer or layers of non-metallic soft material, such as paper or plastic, on one or both sides of the intermediate layer especially when the outer and inner layers are of metal.

Figs. 1 to 6 show certain preferred arrangements which will now be described.

All these figures illustrate tubes made from laminated tapes spirally wound, with "butt" joints, though they could equally well be made from tapes curved longitudinally after the manner of Fig. 11, or (except as hereafter specified) with overlapping joints, spirally wound or longitudinally curved.

Figure 1:
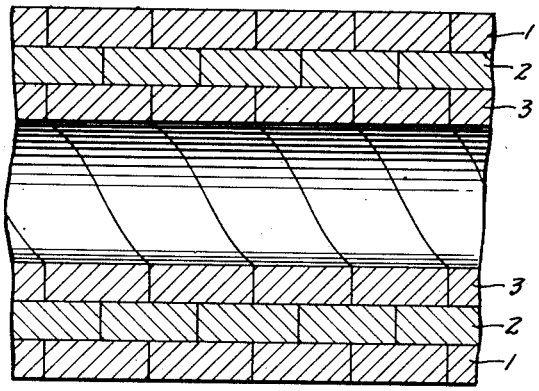
Figs. 1 to 6 show cross-section of tubes having various combinations of materials and various methods of lamination these figures being diagrammatic only, the thickness of the tube walls being much exaggerated for ease of illustration.

In Fig. 1 there are three layers, an outer layer 1, an intermediate layer 2, and an inner layer 3. Layers 1 and 3 may be metallic or non-metallic. Layer 2, the layer to be integrated by heat is preferably of metal of low melting point though it could be of plastic material in a form capable of being integrated by heat.

Figure 2:
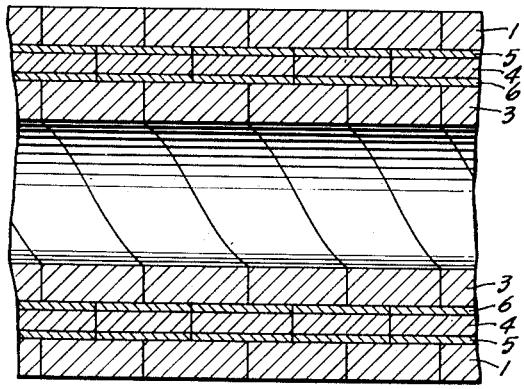

In Fig. 2 there are five layers, outer and inner layers 1 and 3 being as in Fig. 1, but the intermediate layer 4 is of plastic coated on both sides with a low melting point metal to be integrated by heat into the impermeable layers 5 and 6. Alternatively layer 4 could be coated on one side only, in which case either layer 5 or layer 6 would be omitted.

This arrangement is not suitable for tubes when the joints overlap, unless only the inner and outer layers overlap.

Figure 3:
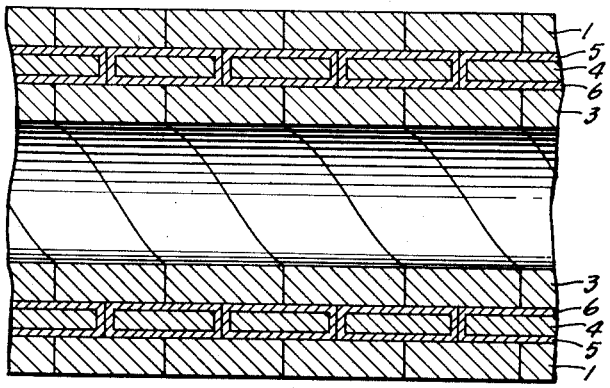

In Fig. 3 the composition of the layers is similar to that for the arrangement of Fig. 2 but the intermediate layer is coated at its edges as well as its flat surfaces, so as to form a continuous coating all round the tape.

When the coating is integrated by heat, layers 5 and 6 form a single continuous moisture-proof barrier of circular formation surrounding layer 4.

Figure 4:
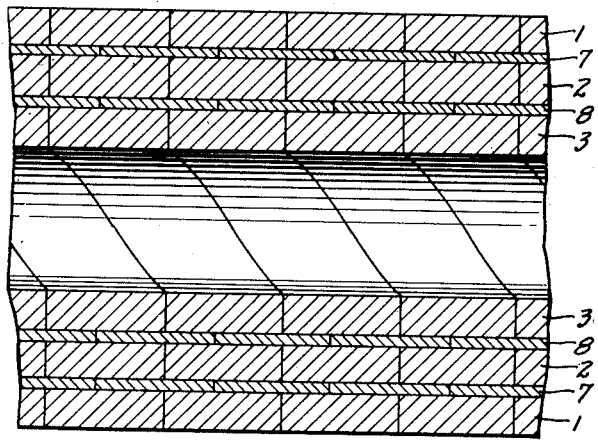

In Fig. 4, the composition is as described in relation to Fig. 1 but on each side of the intermediate integrated layer there is a layer of non-metallic soft material such as paper, forming cushioning layers 7 and 8 and this improves the flexibility of the tube.

Figure 5:
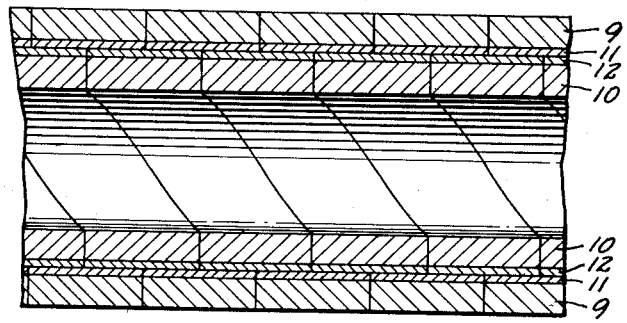

In Fig. 5 there is an outer layer 9 and an inner layer 10, both of non-metallic material such as plastic, the former coated on its inner surface with a layer 11 and the latter coated on its outer surface with a layer 12.

Layers 11 and 12 are of low-melting point metal and are integrated by heat into a single continuous moisture-proof barrier.

This arrangement is unsuitable for use with overlapping joints.

Figure 6:
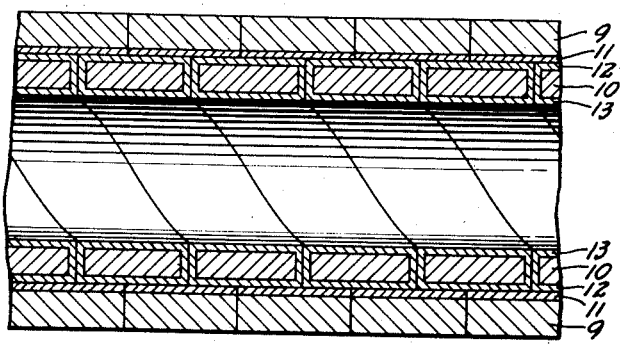

Fig. 6 shows a modified form of the arrangement of Fig. 5, the inner layer 10 being coated both sides and other edges with the layer 12 so as to form, on integration a single continuous cellular layer with layer 11.

This arrangement has the advantage, when used as a sheath for a cable, of providing a metallic shield consisting of the inner surface 13 of layer 12, between the cable and the rest of the tube.

This arrangement may be modified by not coating the edges of layer 10 but modified in this way it is unsuitable for use with overlapping joints.

Methods of heating the intermediate moisture-proof layer

In building up lengths of tube, the tube must be subjected to heat sufficient to soften the intermediate layer and cause it to integrate or join up into a continuous moisture-proof barrier without holes in it. Normally, the method of applying heat will provide for relative movement of the tube and a local heat source. For certain purposes when it is desirable to expose the tube to heat for as short a period as possible, electric heating would be used, particularly induction heating as in the case of British Patent No. 632,657 issued to J. R. Pheazey, or dielectric heating. Either low frequency, or high frequency heating could be used depending on requirements.

The method of applying induction heating must vary according to the construction and method of building the tube. If the layer to be integrated is of metal or a metal coat on a carrier layer material and the outer layer is non-metallic then the metal can be directly heated by eddy currents induced therein by an alternating current coil surrounding the tube.

If the outer layer is of metal of high melting point, and the intermediate layer is partly or wholly of metal of low melting point then the outer layer could be heated inductively and the intermediate layer heated by thermal conduction therefrom. Alternatively, the build-up of the tube could be divided into two operations, the inner and intermediate layers being first formed, the intermediate metal layer or coating then being integrated by induction heating, and finally the outer metal layer applied. If the intermediate layer is wholly non-metallic then either the outer or inner layer must be of metal for induction heating to be used, the outer or inner layer being heated inductively and the intermediate layer heated by thermal conduction therefrom. If the inner layer only were metal then dielectric heating might be used, the inner layer being used as one electrode co-operating with an electrode external to the tube.

If all three layers are non-metallic, then it may be possible to use the mandrel on which the tube is formed or a metallic member of an inner structure on which the tube is built, as the inner electrode for dielectric heating. When using dielectric heating, due consideration must be given to the relative values of heat generated in the intermediate layer and other non-metallic parts of the structure.

In all cases, whether the heating is by electrical or other means, the rate of heating should be high, giving a short heating-up time to avoid damage to adjacent parts by conduction, and forced cooling might be employed.

This is particularly the case when the layer to be integrated consists of low melting-point metal in contact with other layers not capable of withstanding prolonged exposure to the temperature necessary to melt the metal.

Manufacture

The usual way to make tubes of the type described will be to wind layers spirally on one another, either on a mandrel or directly on to some prefabricated structure such as an electric cable for which it is to form a sheath.

Figure 7:
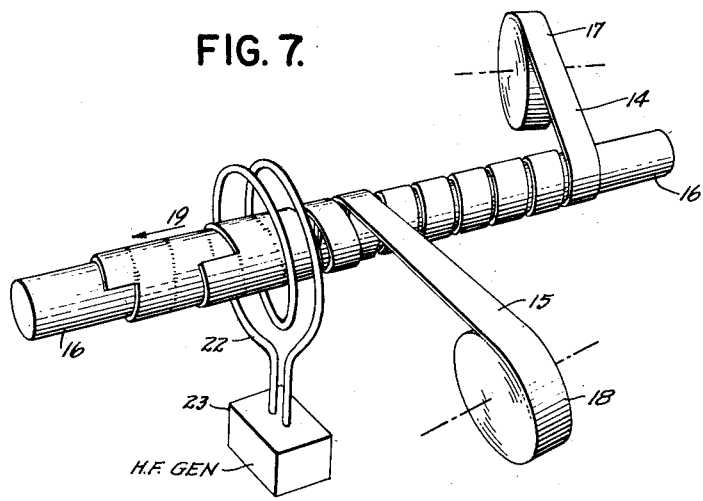
Fig. 7 illustrates diagrammatically a method of making a tube from two spirally wound tapes one or both of which is coated with material integrated by heat as aforesaid.

Fig. 7 shows diagrammatically, a method of doing this, two tapes 14 and 15, being wound on to a mandrel 16.

The mandrel is stationary and the mountings of reels 17 and 18 on which supplies of tapes 14 and 15 respectively are carried, are rotated bodily round the mandrel the finished tube being drawn along the mandrel 16 in the direction indicated by arrow 19. The figure shows the tapes being wound with opposite lays, the reels rotating in the direction indicated by arrows 20 and 21. The tapes could, of course, be wound with the same lay.

This method of construction is specially suitable for making tubes of the type illustrated in Figs. 5 and 6 where non metallic tapes are coated with fusible metal.

After winding the tapes the tube is passed through a high frequency heating coil 22, fed with high frequency electrical energy from a generator 23 and the metallic coats are fused together by induction heating.

Figure 8:
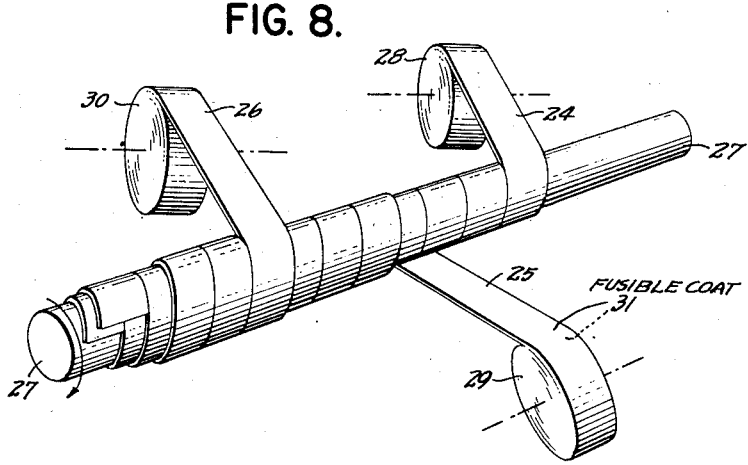
Fig. 8 illustrates diagrammatically a method of making a tube from three spirally wound tapes one of which is coated with material intended to be integrated by heat as aforesaid.

Fig. 8 illustrates a method of making tubes which is similar to that shown in Fig. 7 except that there are 3 tapes 24, 25 and 26, wound on a mandrel 27 from reels 28, 29 and 30.

The figure shows the tapes as being wound with the same lay which permits the mandrel to be rotated and the reels to be held stationary but this arrangement necessitates the rotation of the drum on which the finished tube is collected. This arrangement could of course be used with the mandrel stationary and the reels revolving bodily around it, and indeed this would be essential if the tubes were to be wound with opposite layers or with tapes of different widths requiring different winding rates to cover the same longitudinal rate of progress of the tube.

If the tube is to become a sheath for a structure which must not be heated, this structure may be passed down the centre of a hollow mandrel to join the tube where it parts from the mandrel. This method is preferably combined with high frequency methods of heating the tube and the mandrel may be water or air cooled to protect the structure from heat as it passes the tube heating point somewhere along the length of the mandrel.

The arrangement shown in Fig. 8 is suitable for making tubes of the type illustrated in Figs. 1, 2, 3 and 4, two addition reels being required in the case of Fig. 4 to carry the cushioning layers 7 and 8.

The figure actually shows the making of a tube of the type shown in Fig. 2 or 3. The tape 25 being coated with low melting-point metal on the edges and/or both faces.

Fig. 9 shows diagrammatically a method of making a tube when the tapes are overlapped, at the edges. Tapes 32 and 33 are wound with the same lay on a mandrel 34 which rotates.

A tube of this type is not illustrated in Figs. 1 to 6 but it can readily be understood from Fig. 9 that the same method could be applied to the making of any of the tubes illustrated in those figures when the tapes may overlap at the edges.

Fig. 9 as actually drawn illustrates the fact that two layers of, say metal, coated with fusible metal, on one side and both edges, as shown at 36, and wound with overlapping edges with at least half of the width of each tape overlapping may be wound then one over the other so that an edge of one layer butts with an edge of the other, and when the coat is fused, a continuous moisture-proof barrier layer is produced.

Figure 10:
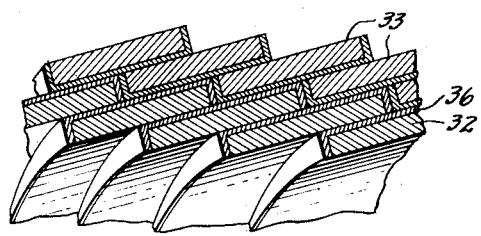
Fig. 10 is a part section of a type of tube which can be made by the method shown in Fig. 9.

Fig. 10 shows a part section of a tube made in this way.

In Fig. 9, the gas jet 35 represents any convenient form of heating.

Instead of winding the tape spirally, one or more layers may be made with a single longitudinal joint, by feeding the tape axially into a cylindrical die for instance, and folding it axially into cylindrical shape, as shown in Fig. 11.

There are several ways of dealing with the joint. It may be a butt joint for instance, as shown in the case of tube 1 of Fig. 11. If so, and, if it is to form an intermediate layer and consists of a carrier coated with low melting-point material, the coating must be carried round the edges.

On the other hand the edges may overlap as shown in the case of tube 2 of Fig. 11, or even to the extent of the complete circumference of the finished cylinder or more. Here again the edges of a carrier coated with fusible material should be coated also if it is to form the impermeable layer of a tube.

Longitudinally folded tapes may have upset edges which can be turned over or made into a folded joint of the type used for the axial joint of a tin-can barrel.

Longitudinally folded material could be used for one or both layers of a tube of the type shown in Fig. 5 and in the case of layers 9 and 10, both being so folded, there would be no need to continue the coating 11 and 12 round the edges of the strip provided that the joints were staggered. If one layer was folded and the other spirally wound however, there would be intersections of the spiral joint and the longitudinal joint and it would be advisable to continue the fusible coating round the edges of at least one of the strips.

In applying induction or dielectric heating, the electrodes would be shaped to suit the type of joint, which may be a line butt-joint or an overlap joint extending around the tube to an extent which may vary from a few degrees to 360 degrees or more.

It is not essential for tubes of the type described to be built up from strips of material. One or more of the layers could be extruded from plastic with the middle layer formed from tape with spiral or longitudinal joints. Alternatively either the inner or outer layer could be extruded, and the other as well as the middle layer formed from tape. It is also envisaged for instance that an inner and an intermediate layer might be formed as a sub-assembly from tape, and corrugated, as hereafter described, after which an outer layer could be extruded over the sub-assembly.

*Flexibility*

It is known to build a tube of a plurality of layers spirally wound from tapes of various materials in varying combinations, and to obtain flexibility by circumferentially or helically corrugating the tube, for instance by the action of internal and external complementary screw threads. Depending on the purpose for which the tube is to be used and the pitch of the screw threads used, the corrugations may be partly or wholly closed up on one another, that is concertina-ed, by axial pressure. This pressure may be applied for instance, during a continuous operation of winding, corrugating, and concertinaing, in a direction opposite to the direction of build-up of the tube by slowing down its rate of movement relative to that which it leaves the corrugating tools.

Any variant of the above procedure may be used in building up a tube of the type now proposed, the integration of the intermediate layer by heat being performed either between winding and corrugating, between corrugating and concertina-ing, or after the last mechanical operation whether this is corrugating or concertina-ing.

As previously stated, the winding of the tapes to form the tube might be divided into two operations in which case the continuous operation would consist of the winding of the outer layer on to a pre-formed tube comprising inner and intermediate layers with the intermediate layer integrated or made continuous by heat, the winding of the outer layer being followed by corrugating, followed if required by concertina-ing to a more or less extent.

Fig. 12 illustrates the making of corrugated tube from strip material spirally wound. The figure is purely diagrammatic and represents the steps of the process and not an actual machine.

Three strips 37, 38, 39 are wound from reels 40, 41 and 42 onto a mandrel 43.

The drums revolve around the axis of the mandrel in the same or opposite directions one from another.

The build-up tube 44 passes through a heating chamber 45 which in practice may be replaced by high frequency heating means.

On emerging from 45 the tube, with its intermediate layer or layers integrated by heat passes over threaded end 46 of the mandrel 43 and through a co-operating internally screw-threaded member or nut 47 where it is creased as the first stage of corrugating it.

The figure shows the mandrel as revolving in such a direction that the threaded end 46 drives the tube from right to left.

The thread in nut 47 must correspond to 46 and must be maintained in constant longitudinal relation thereto. It must also revolve in the same direction and at the same speed as 46 so that there is a space between the two at all points, substantially equal to the thickness of the tube wall.

The tube is held stationary by the left hand end (the finished product), passing into a brake 48 which holds the tube from rotating, for which purpose it may be longitudinally ridged, and which restrains longitudinal movement of the tube.

The result of this restraint is to impose an end thrust on the tube which closes up the corrugation to a degree which can be adjusted by adjusting the restraint applied by the brake.

The reels 40, 41, 42 or any of them, may be mounted on the same axle as the mandrel, or in any other way so as to rotate with the mandrel, but any layer wound from such a reel will have its spiral joints running in the same sense as the spiral convolutions of the final corrugated tube. It may be preferable therefore to rotate one or more of the reels in the opposite direction to that of mandrel so that the spiral joints run across the hills and dales of the corrugation. This will usually be of minor importance however, in the case of layers to be integrated by heat.

It is possible to hold mandrel 43 and nut 47 stationary and rotate the tube, but this would necessitate revolving the drum on which the finished tube is collected and it is usually desired to avoid this.

The method illustrated in Fig. 12, may be used to apply a corrugated sheathing to a prefabricated structure such as an electric cable.

For this purpose the mandrel would be bored out axially and the cable would pass down the bore.

When the corrugations are closed up by the back-thrust of brake 48, the internal diameter at the ridges of the corrugation, closes in somewhat and it can be arranged for this closing in to tighten the tube on to the cable to any required degree, since the cable is smaller than the internal bore of the tube when it first leaves the mandrel by at least the thickness of the hollow mandrel wall.

*Variable volume*

Tubes made in accordance with the invention may be used as sheathing for oil-filled cable, advantage being that the corrugations will distort under pressure to provide for expansion of the oil due to rise in temperature. For such a purpose the corrugations should preferably not be entirely closed on one another. Increase of the internal pressure due to expansion of the oil would distort the contour of the corrugations so as to increase the total capacity of the oil space. In such circumstances at least one layer of material having high elasticity and high elastic limit, preferably metallic, is required so as to return the tube from a distorted condition to its original shape when the pressure is removed due to lowering of the temperature of the oil. The variable volume feature due to distortion of the corrugation is, of course, not confined to cable sheathing applications, there being many uses for a tube having this feature.

What is claimed is:

1. Process for manufacturing a flexible continuous moisture-proof composite tubular article that comprises helically winding strip material upon a support so that the edges of the strip abut to define a first tubular element, helically winding onto said first tubular element strip material comprising at least a coating of a readily fusible metal wound with abutting edges to define a second tubular element, thereafter applying to said second tubular element at least one overlying layer and then heating the readily fusible metal winding to cause consolidation thereof into an intermediate continuous moisture-proof layer.

2. A method as claimed in claim 1 in which an intermediate layer integrated by heat as aforesaid is separated from an adjacent layer by a layer of resilient material.

3. A process as defined in claim 1, further characterized in that the strip material defining the second tubular element comprises a strip of flexible plastic bearing a coating of readily fusible metal.

4. A process as defined in claim 1, further characterized in that the strip material defining the second tubular element comprises a tape of relatively high melting point metal bearing a coating of readily fusible metal.

5. A flexible continuous moisture-proof composite tubular article that comprises an innermost layer of helically wound strip material arranged so that the edges thereof abut, an outer layer of helically wound strip material, and an intermediate layer of helically wound strip material arranged so that the edges thereof abut, said intermediate layer disposed between said innermost layer and said outer layer and having a coating of a readily fusible material consolidated with one of said other layers to form a continuous surface moisture-proof barrier, said coating having a lower fusion point than said strip materials.

6. A flexible continuous moisture-proof composite tubular article as defined in claim 5, further characterized in that the intermediate layer is comprised of a helically wound strip of plastic material coated with readily fusible metal, thermo-consolidated into a continuous moisture impervious surface, said metal having a lower melting point than any of said strip materials.

7. A flexible continuous moisture-proof composite tubular article as defined in claim 5, further characterized in that the intermediate layer is comprised of a helically wound tape of relatively high melting point metal bearing a coating of readily fusible metal thermo-consolidated to constitute a continuous moisture impervious surface, said fusible material having a lower melting point than any of said strip materials.

THOMAS ROBERTSON SCOTT.
WILLIAM KIRBY WESTON.

References Cited in the file of this patent

UNITED STATES PATENTS

| Number | Name | Date |
|---|---|---|
| 9,278 | Prosser | Sept. 21, 1852 |
| 1,481,341 | Bersted | Jan. 22, 1924 |
| 1,566,512 | Subers | Dec. 22, 1925 |
| 1,586,750 | Joline | June 1, 1926 |
| 2,039,781 | Debenedette | May 5, 1936 |
| 2,247,197 | Graves | June 24, 1941 |
| 2,354,556 | Stahl | July 25, 1944 |
| 2,446,490 | Scherer | Aug. 3, 1948 |

FOREIGN PATENTS

| Number | Country | Date |
|---|---|---|
| 520,767 | Great Britain | May 2, 1940 |